No. 766,884. PATENTED AUG. 9, 1904.
J. A. HUNT.
HYDROCARBON BURNER.
APPLICATION FILED AUG. 31, 1903.
NO MODEL.
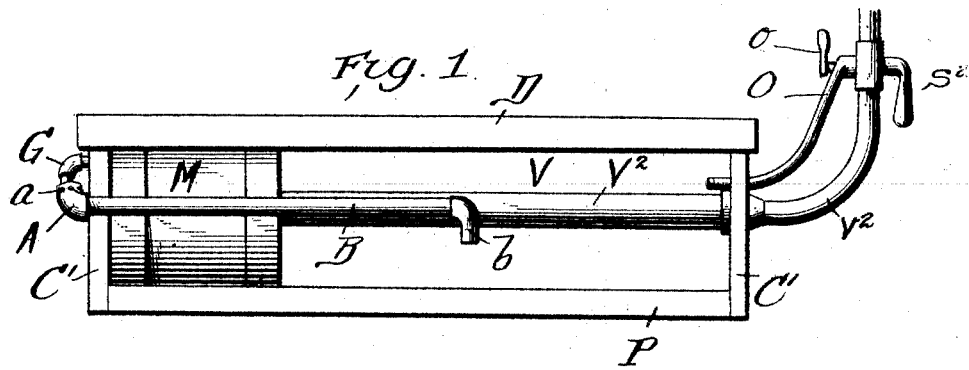
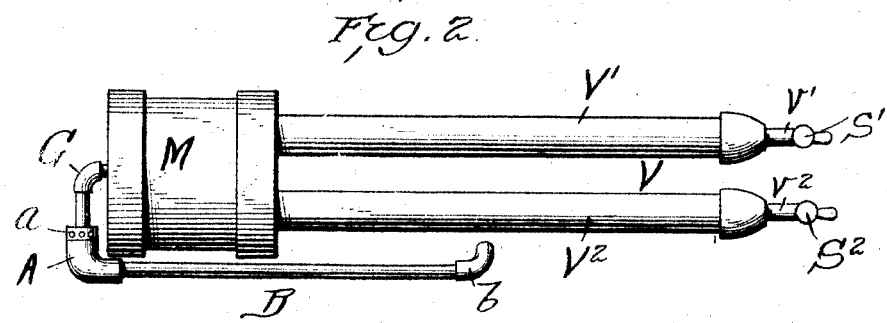
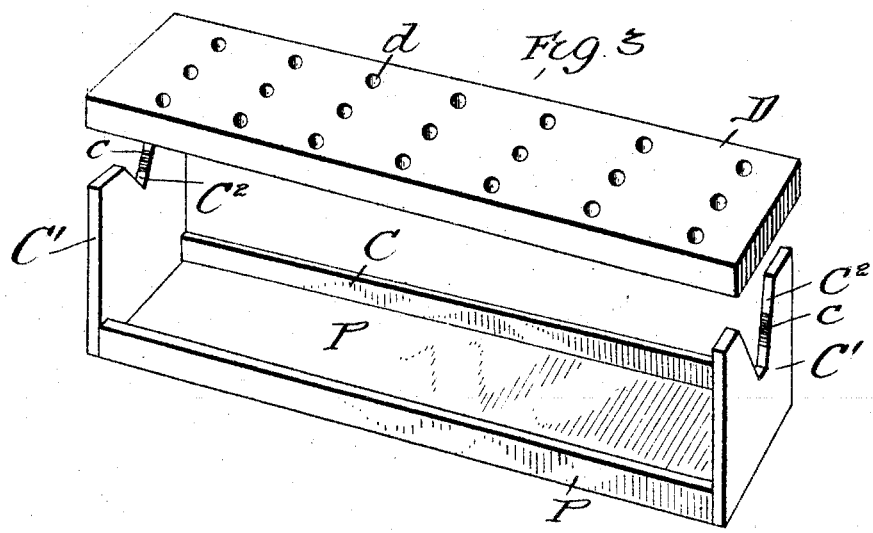

No. 766,884. Patented August 9, 1904.

UNITED STATES PATENT OFFICE.

JOHN ATKINSON HUNT, OF BOSTON, MASSACHUSETTS, ASSIGNOR TO HIMSELF AND HARRIS B. MITCHELL, OF MALDEN, MASSACHUSETTS.

HYDROCARBON-BURNER.

SPECIFICATION forming part of Letters Patent No. 766,884, dated August 9, 1904.

Application filed August 31, 1903. Serial No. 171,445. (No model.)

*To all whom it may concern:*

Be it known that I, JOHN ATKINSON HUNT, a citizen of the United States, residing at Boston, county of Suffolk, and Commonwealth of Massachusetts, have invented certain new and useful Improvements in Hydrocarbon-Burners, of which the following is a specification.

This invention relates to an improvement in apparatus for vaporizing oil and water, mixing the two, and superheating the mixture for combustion; and it consists in certain novel features of construction more fully described hereinafter.

In the drawings, in which like letters of reference indicate corresponding parts throughout, Figure 1 is a side view of the burner and casing. Fig. 2 is a plan view of the burner removed, and Fig. 3 is a view of the casing.

V is a vaporizer consisting of parallel tubes connecting at one end with tubes $V'$ and $V^2$, which supply them, respectively, with water and hydrocarbon. These tubes $V'$ and $V^2$, which supply them, are connected with supply-tanks of any known construction controlled by valves $S'$ and $S^2$.

The vaporizing-tubes enter the mixer M at one side and in the same direction.

G is a gas-pipe located out of line with the vaporizing-tubes, which conducts the mixed gases from the mixing-chamber M to the burner-pipe B. By this arrangement of the tubes and pipe the water and hydrocarbon vapor are forced into M and against its opposite walls, from which they are baffled back and thoroughly mixed without the liability of excessive pressure in one vaporizer overcoming that of the other and forcing back the vapor therein and of the gases passing directly through the mixer without being properly united.

A is a coupling uniting G and B, having openings $a$, through which air is drawn.

$b$ is a burner-nozzle for deflecting the flame down against the pan P, which forms the pan-bottom of the casing C. From this it is thrown up against and through the vaporizing-tubes and against the mixer M. The end walls of the casing C are notched to receive the pipes G and $V'$ and $V^2$, as at $C^2$, and the faces of the recess are roughened, as at $c$, so that the pipes when laid therein are tightly held. The vaporizing-pipes $V'$ and $V^2$ being spaced apart yield slightly and when pressed into the notch bind against its roughened sides and are firmly held, as stated above.

The cover D is suitably perforated and is usually cast in one piece, as is also the other portion of the casing.

From the oil-pipes above the valve $S^2$ is a pipe which leads to the pan $P'$ and has a controlling-valve $o$ therein, which regulates the supply through it.

The operation of the burner is as follows: A small amount of hydrocarbon is allowed to flow into the bottom of the pan, and the same is then ignited. As this heats the tubes $V'$ and $V^2$ the valves $S'$ and $S^2$ are opened to admit a supply of hydrocarbon and water, which is vaporized in the now hot tubes. From these the gases pass to the mixer M, where they are thoroughly mixed. Then this mixture passes through the pipe G and into the coupling A, where it receives the air-supply, and from which it passes through B to the burner $b$, which being lighted will throw its flame against the bottom P of the casing C, where it is baffled back upon the vaporizer, so that the process is made continuous.

The box C and the mixing-chamber are usually castings, and the vaporizing-tubes are tapped directly in the mixing-chamber M, so that the construction is exceedingly simple. When the vaporizer is laid in the box, the pipes $V'$ and $V^2$ and G project through the openings $C^2$, which by their V-shaped walls support and securely hold the burner, so that no fastenings are required.

The burner may be started up by other means, of course, than the oil-supply $o$, and the air-supply A may be omitted without affecting the operativeness of the machine; but both of these features are preferred, as they increase the effectiveness of the burner and the ease with which they are operated. The number of vaporizing-tubes may also be increased without departing from the spirit of my invention.

What I therefore claim, and desire to secure by Letters Patent, is—

1. A hydrocarbon-burner comprising comparatively parallel tubes of relatively small diameter, a relatively larger mixing-chamber to which said tubes are connected, both tubes entering the same end of said chamber, a vapor-discharge tube extending from said mixing-chamber and terminating below said parallel tubes and oil and water connections for said tubes.

2. The combination of a hydrocarbon-burner having tubes held substantially parallel but adapted to yield slightly laterally and a support having a substantially V-shaped recess to receive and hold said tubes.

3. The combination of a hydrocarbon-burner having tubes held substantially parallel but adapted to yield slightly laterally and a support having a substantially V-shaped recess to receive said tubes, the faces of said recess being roughened to hold the same.

In testimony whereof I affix my signature in presence of two witnesses.

JOHN ATKINSON HUNT.

Witnesses:
GEORGE B. SEARS,
ELLIS SPEAR, Jr.